Oct. 4, 1932.  D. ALLENSON  1,881,112
DANDELION DIGGER
Filed July 10, 1931
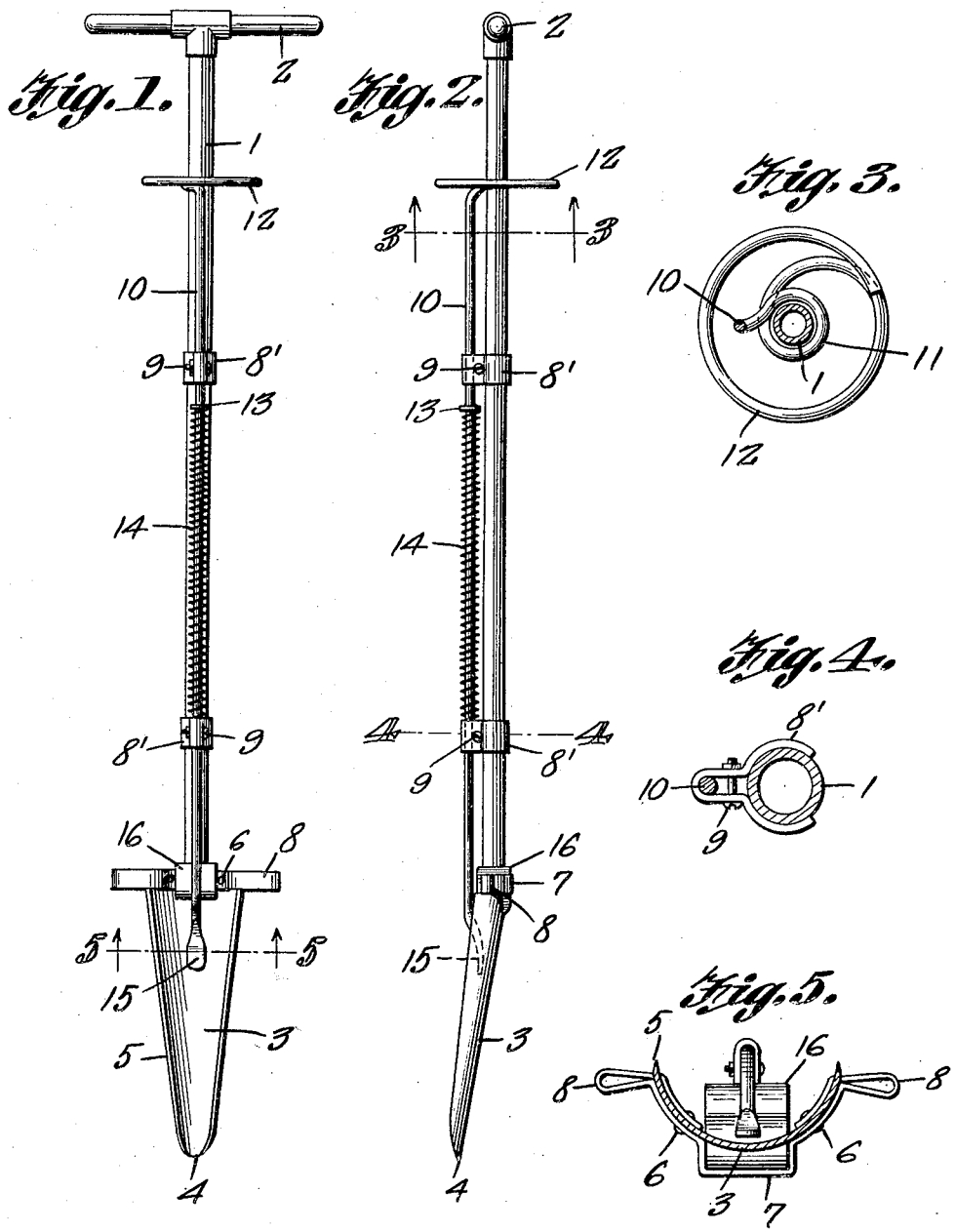
David Allenson, INVENTOR Patented Oct. 4, 1932

1,881,112

UNITED STATES PATENT OFFICE

DAVID ALLENSON, OF RILEY, KANSAS

DANDELION DIGGER

Application filed July 10, 1931. Serial No. 549,988.

This invention relates to an improved dandelion digger and it consists in the novel features hereinafter described and claimed.

An object of the invention is to provide a digger of the character stated which is in the general form of a shovel or spade having an especially designed blade adapted to be inserted in the soil under the roots of the plant and being so shaped that it may be rotated when inserted in the soil to cut the soil and roots of the plant so that the plant may be lifted out of the ground. Means are provided for removing the plant from the blade after lifting them out of the ground so that the blade may be easily and quickly cleaned.

In the accompanying drawing:—

Figure 1 is a side elevational view of the dandelion digger showing the blade thereof in side elevation.

Figure 2 is a similar view showing the blade in edge elevation.

Figure 3 is a detailed sectional view cut on the line 3—3 of Figure 2.

Figure 4 is a similar view cut on the line 4—4 of Figure 2.

Figure 5 is a transverse sectional view of the blade cut on the line 5—5 of Figure 1.

The dandelion digger comprises a shaft 1 having a handle 2 at the upper end thereof. A blade 3 is applied to the lower end of the shaft 1 and the said blade is in the general form of a section of a cone whereby the blade is pointed at one end as at 4 and the side edges of the blades are beveled as at 5 forming cutting edges. A strip of metal 6 is applied to the upper end of the blade 3 and the said strip is provided at the rear side of the blade with a loop 7 which receives the lower end of the shaft 1. At the side edges of the blade the strip 6 is extended outwardly in the form of folds 8 which may serve as foot rests. The ends of the strip 6 are secured to the forward side of the blade 3 as best indicated in Figure 5 of the drawing.

Guides 8' are applied to the intermediate portion of the shaft 1 and are clamped in position thereon by means of bolts 9. A rod 10 is slidably mounted in the guides 8' and the upper portion of the rod 10 is coiled around the shaft 1 as at 11 and from the said coil the rod 10 is extended outwardly in a spiral direction and formed with a circular upper end 12 which may serve as a handle for depressing the rod as will be hereinafter explained. At a point between the guides 8' the rod 10 is provided with a stop shoulder 13. A spring 14 is coiled about the rod 10 and interposed between the stop 13 and the lower guides 8'. The lower end of the rod 10 is flattened as at 15 and is bent inwardly toward the forward surface of the blade 3. The lower end of the shaft 1 is received in a socket 16 carried at the upper end of the blade 3 and the socket 16 is received in the loop 7 hereinbefore described.

In operation the point of the blade 3 is placed close to the dandelion and pushed into the soil by using the handle 2 and the foot rest 8 in a usual manner. The shaft 1 is then turned whereby the blade 3 is moved around in the soil and the soil is cut close to the roots of the plant. The blade is then lifted out of the ground bringing with it the plant and the attached soil. When the blade is above the surface of the ground pressure in a downward direction is applied to the circular handle portion 12 of the rod 10 and the rod is forced down against the tension of the spring 14 and the flattened end 15 pushes the plant and the soil from the blade. Thus the blade is easily and quickly cleaned. When pressure is removed from the handle 12 the spring 14 moves the rod 10 back to its normal position.

Having described the invention what is claimed is:—

A plant digger comprising a shaft having a handle, a blade carried at the lower end thereof and disposed at an angle to the handle, guide members mounted upon the shaft, a rod slidably mounted in the guide members and having an end portion disposed toward the forward surface of the blade and spring means interposed between the rod and one of the guides, said rod adapted to slide at an angle to the blade.

In testimony whereof I affix my signature.

DAVID ALLENSON.